Oct. 12, 1943.    C. M. FRIDEN ET AL    2,331,829
CARRIAGE SHIFT MECHANISM FOR CALCULATING MACHINES
Original Filed July 1, 1940    4 Sheets-Sheet 1
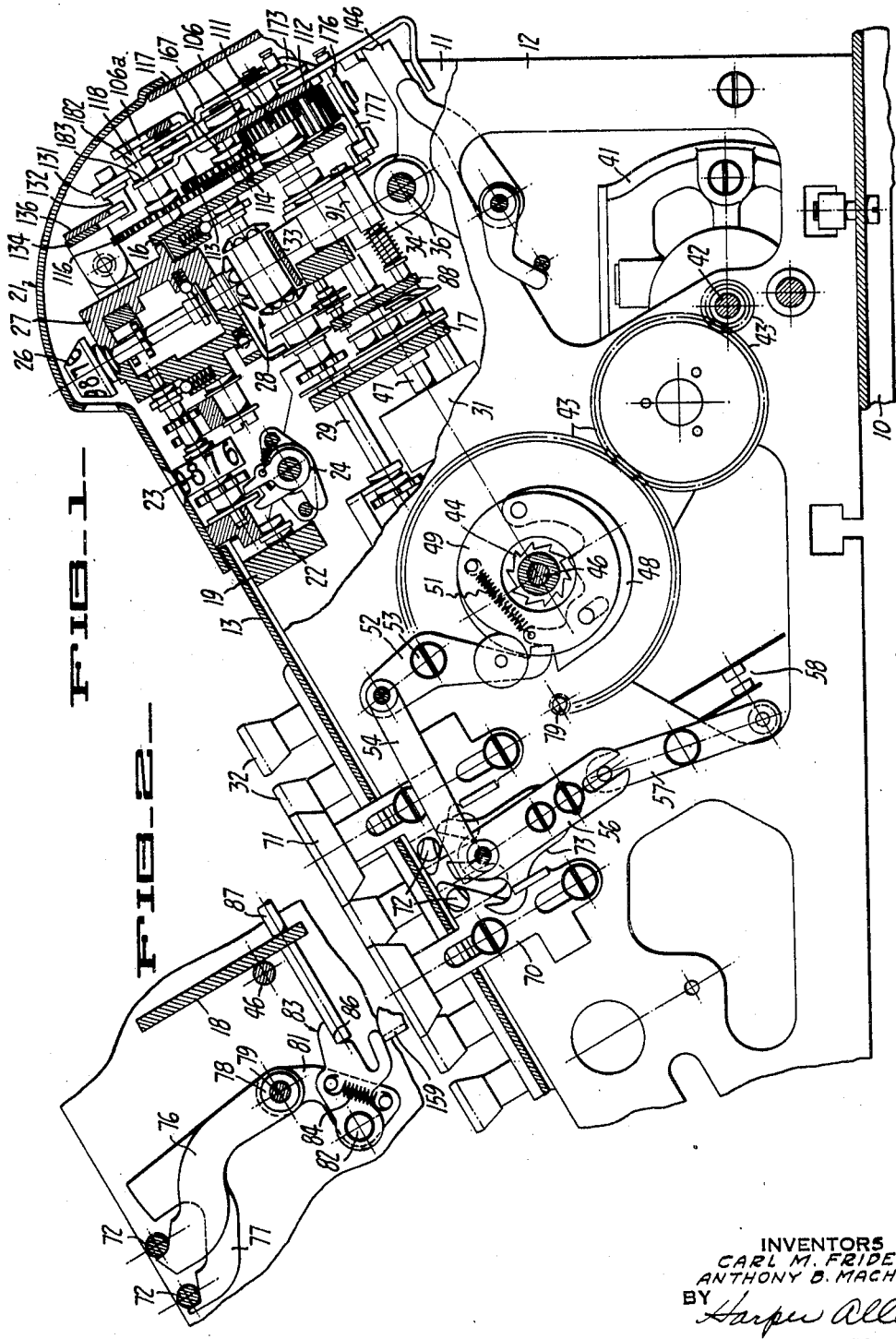
INVENTORS
CARL M. FRIDEN
ANTHONY B. MACHADO
BY Harper Allen
ATTORNEY Oct. 12, 1943.  C. M. FRIDEN ET AL  2,331,829
CARRIAGE SHIFT MECHANISM FOR CALCULATING MACHINES
Original Filed July 1, 1940  4 Sheets-Sheet 2
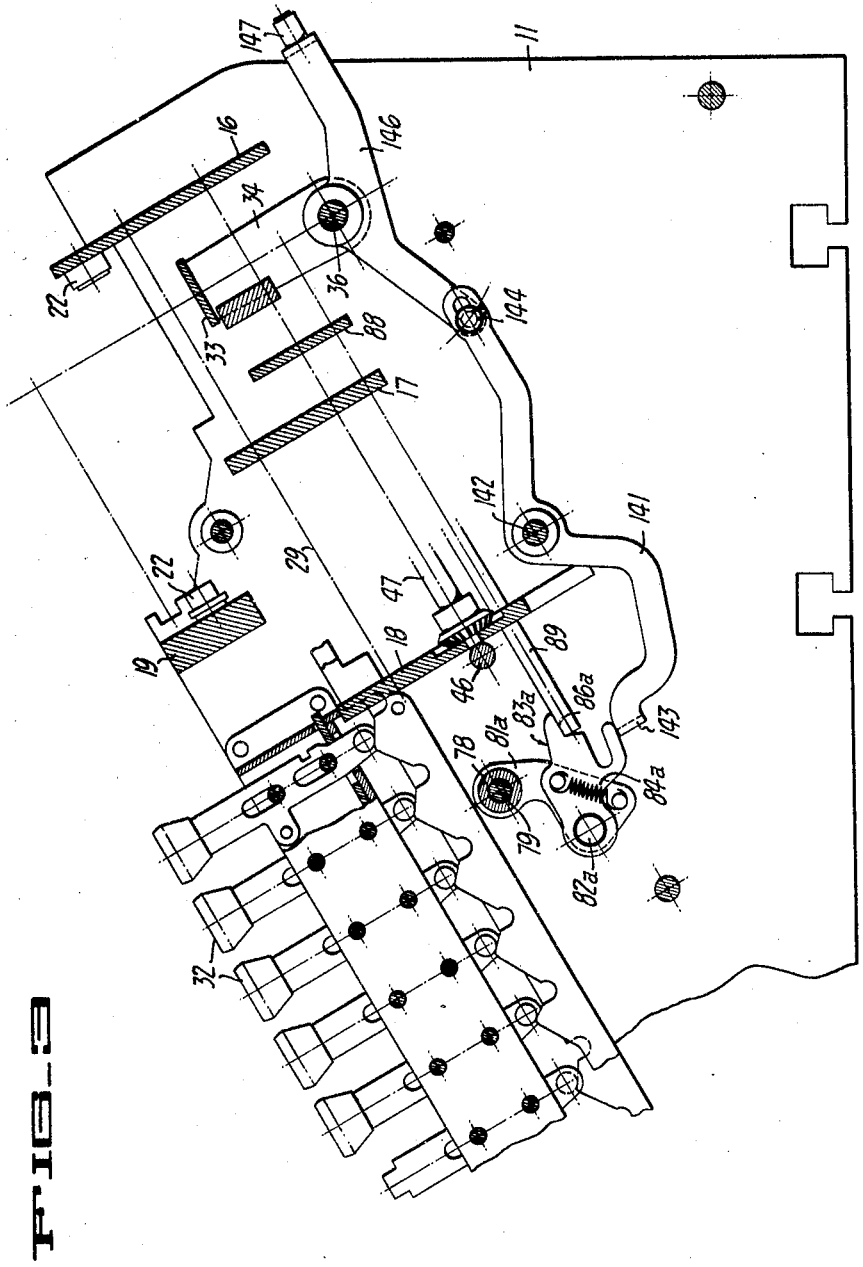
INVENTORS
CARL M. FRIDEN
ANTHONY B. MACHADO
BY Harper Allen
ATTORNEY

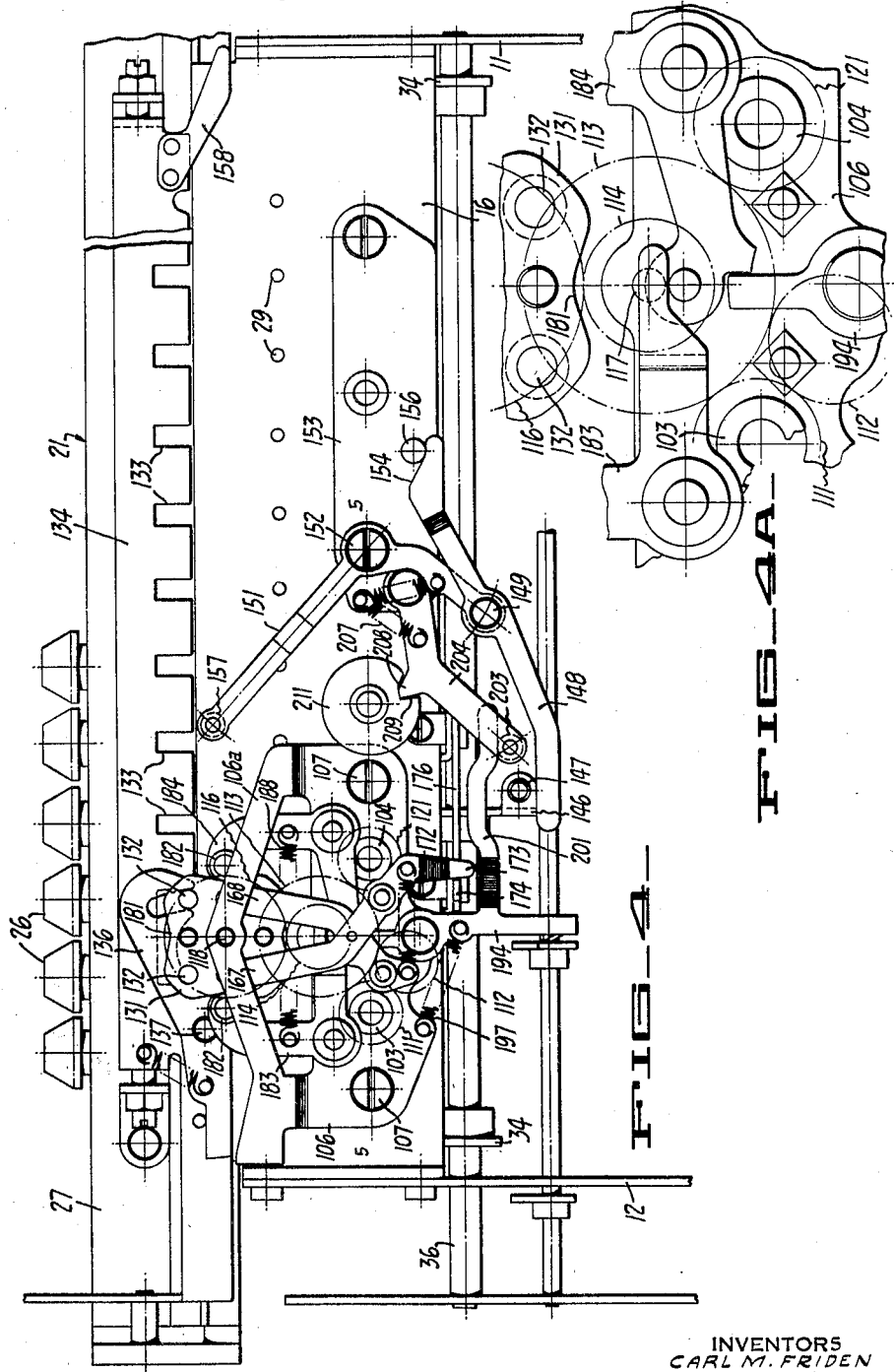

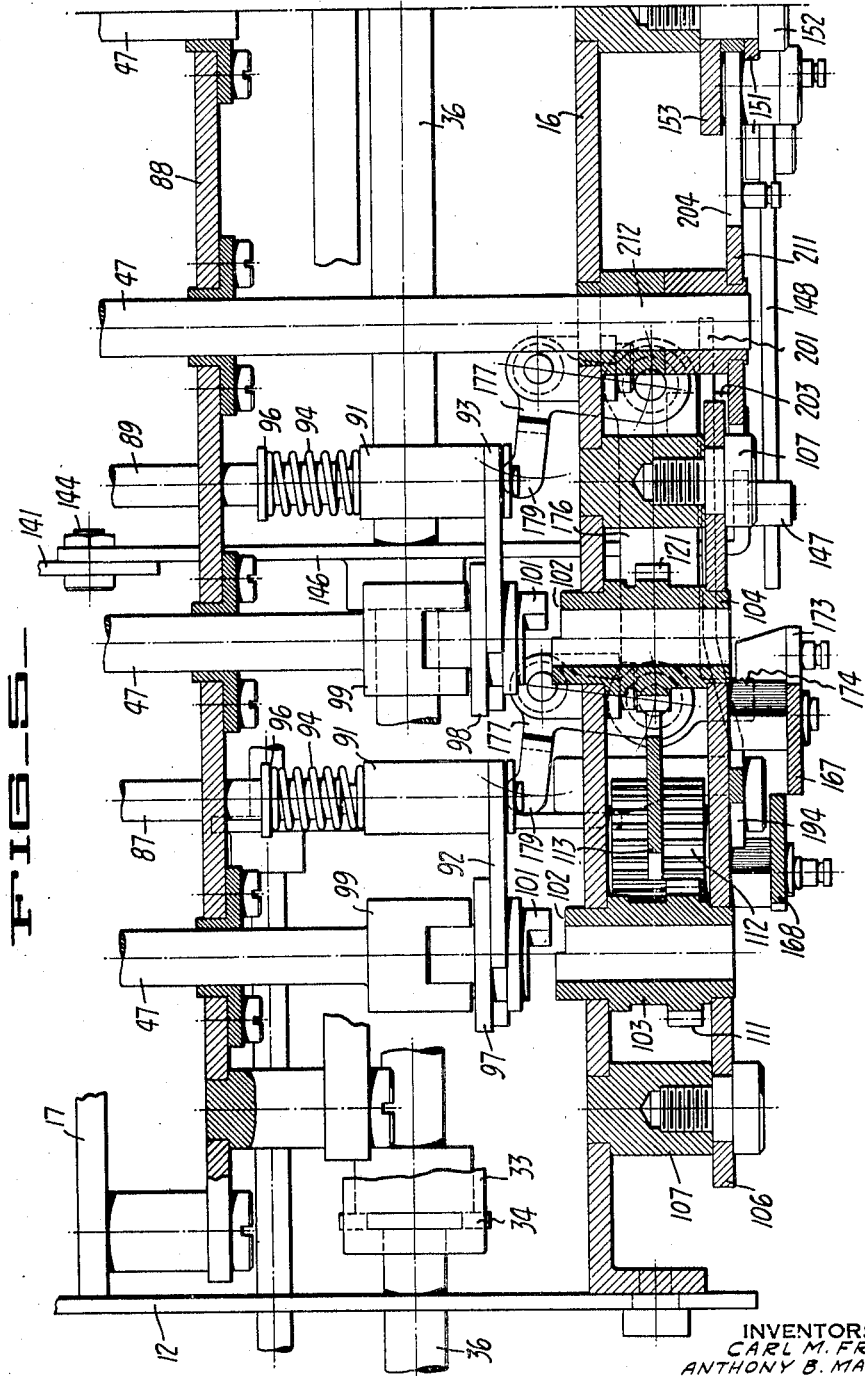

Patented Oct. 12, 1943

2,331,829

UNITED STATES PATENT OFFICE 2,331,829

CARRIAGE SHIFT MECHANISM FOR CALCULATING MACHINES

Carl M. Friden, Pleasanton, and Anthony B. Machado, Oakland, Calif., assignors to Friden Calculating Machine Co., Inc., a corporation of California Original application July 1, 1940, Serial No. 343,368. Divided and this application June 2, 1941, Serial No. 396,307

2 Claims. (Cl. 235—63)

This invention relates to calculating machines, and is concerned more particularly with the provision of improved shifting means for preventing further operation of said shifting means when the carriage enters an end position.

It is a general object of the invention to provide an improved shifting mechanism for the shiftable register carriage of calculating machines.

Another object of the invention is to provide improved control means whereby the operation of the shift mechanism is interrupted when the carriage enters an end position.

Other objects and advantages of the invention will be apparent from the following description of a preferred embodiment thereof, which is illustrated in the accompanying drawings.

In the drawings:

Figure 1 is a side elevational view partly in section of a calculating machine embodying the invention;

Figure 2 is a fragmentary, sectional elevation illustrating certain of the shift control connections;

Figure 3 is a longitudinal sectional view showing a part of the shift control connections;

Figure 4 is a rear elevational view of the machine showing the shifting mechanism and a part of the control for interrupting operation of such mechanism as the carriage enters an end position;

Figure 4A is an enlarged detail of a portion of Figure 4;

Figure 5 is a horizontal sectional enlarged view taken in a plane indicated by the line 5—5 in Figure 4.

Referring to Figures 1 to 4, the calculating machine selected for illustration in connection with the invention is of the general type described in the patent to Carl M. Friden No. 2,229,889, dated January 28, 1941. The machine includes a base 10 upon which side plates 11 and 12 of the frame construction are mounted within the casing 13. The frame of the machine also includes transverse brackets 16, 17, 18 and 19 which extend between the side plates 11 and 12 and are secured thereto in any convenient manner.

The machine includes a shiftable register carriage 21 which is mounted for endwise sliding movement on frame brackets 16 and 19 by means of rollers 22. The register carriage 21 serves to mount the numeral wheels 23 of the revolutions counter having an actuator 24 of suitable construction associated therewith. The carriage 21 also mounts numeral wheels 26 of the accumulator which are suitably journaled in carriage frame 27 and adapted for actuation through suitable plus-minus gearing 28 having a sliding driving engagement with a shaft 29. Each shaft 29 receives differential increments of movement in a known manner from the associated actuating cylinder 31 under control of the usual bank of numeral keys 32 associated therewith. The sign character of the registration is controlled by shifting of the plus-minus gearing 28 under the control of a strap 33 which is mounted by suitable upright arms 34 on a transverse rockable shaft 36 which may be controlled in any convenient manner in performing calculating operations.

The drive for the actuating cylinders 31 and for all other power-driven power operations of the machine is derived from motor 41 having its drive shaft 42 connected by gearing 43 with the driving element or ratchet 44 of a cyclically operable clutch. Ratchet 44 is journaled on driven shaft 46 which is suitably connected to drive actuating shafts 47 on which the cylinders 31 are mounted. The cyclic operation of the clutch is controlled by means of clutch dog 48 carried by driven part 49 of the clutch and spring-urged by means of spring 51 to clutch-engaging position.

The engagement of the clutch is controlled by means of clutch control lever 52 pivoted at 53 on side plate 12. Control lever 52 is connected by link 54 with the pivoted lever 56 which is pivotally connected at its lower end with a second pivoted lever 57 which controls the opening and closing of motor circuit contacts 58.

*Shift mechanism.*—Means are provided for shifting the carriage selectively in either direction for one or more ordinal steps of movement, and the shifting means is preferably operated from the actuating shafts 47 and the cyclically operable clutch under the control of a pair of manually depressible, freely retractable shift keys which control shifting of the carriage for one or more steps of movement in accordance with the length of time (the number of machine cycles) which they are maintained depressed.

Referring to Figures 1 and 2, the shift control keys are indicated at 70 and 71 and are mounted for vertical sliding movement on side plates 12 by suitable pin and slot connections. Suitable spring means (not shown) may be provided for maintaining keys 70 and 71 in their raised positions as shown in Figure 1. As seen in Figure 1, each key 70 and 71 is provided with a pin 72 which projects to either side of the key. One end of each pin 72 cooperates with a suitable cam surface on a claw arm 73 secured to lever 56 for rocking movement therewith. Therefore, upon depression of either shift key 70 and 71, levers 56 and 57 are rocked to engage the clutch and close the motor circuit contacts 58.

Prior to the engagement of the clutch and closing of the motor contacts, each of keys 70 and 71 is operative to engage corresponding shift connections, so that selective shifting movement of the carriage 21 in either direction for one or more ordinal positions is determined by depression and release of the respective keys. As seen in Figure 2, the respective left-hand ends of pin 72 carried by the keys 70 and 71 are operatively related to arms 77 and 76, respectively, which are carried by sleeve 78 and shaft 79 on which sleeve 78 is pivotally mounted. As seen in Figure 2, sleeve 78 also carries a depending arm 81 having a pin 82 thereon on which a pusher link 83 is pivotally mounted. Spring 84 urges pusher link 83 in a clockwise direction to maintain its notched end 86 in operative engagement with push rod 87 which may be slidably mounted for endwise movement in the cross-brackets 18 and 88 (Figures 2 and 5). Referring to Figure 3, shaft 79 also carries a depending arm 81a on which a spring-urged pusher link 83a is pivoted for engagement with a push rod 89 (Figures 3 and 5) which rod 89 is similar in all respects to push rod 87.

The respective push rods 87 and 89 upon depression of the respective keys 71 and 70 serve to enable respective drive connections from the actuating shaft to a shift drive gear in a manner to be described. As seen in Figure 5, the push rods 87 and 89 are telescopically engaged within a collar 91, the respective collars 91 being secured to respective forked arms 92 and 93. Respective springs 94 compressed between collars 91 and washers 96 on respective rods 87 and 89 to maintain each telescopic push rod connection in extended position.

Forked arms 92 and 93 engage respective annular grooves in shiftable drive-establishing collars 97 and 98, which have endwise slidable driving engagement with fixed collars 99 secured on the rearward ends of adjacent actuating shafts 47.

Collars 97 and 98 (Figure 5) are provided with respective driving teeth 101 for engagement with opposed driving notches 102 in respective gear sleeves 103 and 104. Gear sleeves 103 and 104 are journaled in brackets 16 and plate 106 mounted on brackets 16 by means of suitable spacers and bolt connections 107.

As seen in Figures 1 and 5, gear sleeve 103 carries gear 111 which meshes with wide idler gear 112 suitably journaled on bracket 16 and plate 106. Idler gear 112 also meshes with large gear 113 of a double gear assembly including a small gear 114 meshing with shift drive gear 116. The gear assembly 113 and 114 are carried by shaft 117 suitably journaled in brackets 16 and plate 106. Gear 116 is carried by shaft 118 suitably journaled in brackets 16 and in upward offset portion 106a (Figure 5) of plate 106.

As seen in Figure 4, gear sleeve 104 carries gear 121 which meshes directly with gear 113 of the double gear assembly. The result is that gear sleeves 103 and 104, when driven, serve to drive the gear train including gears 113, 114, and 116 in opposite directions. The gearing provides a drive ratio of four to one, so that each rotation of the gear sleeve 103 or gear sleeve 104 will provide a one-quarter rotation of gear 116.

As seen in Figures 1 and 4, shaft 118 which carries shift drive gear 116 also carries a drive plate 131 carrying four equally spaced shift drive pins 132 for engagement with notches 133 of shift rack 134 on carriage 21. As seen in Figure 4, yieldable pawl 136 pivoted at 137 on rack 134 provides one wall of one end slot 133, so that the disc 131 upon clockwise rotation, as shown in Figure 4, will be ineffective to shift the carriage past its end position but can become effective upon counter-clockwise movement to shift the carriage from its leftmost position as viewed from the front of the machine.

The arrangement is such that depression of key 70 operates through the associated linkage to engage drive tooth 101 with its corresponding notch 102 (Figure 5) of gear sleeve 103 to effect right-hand shifting of the carriage (i. e., to the left as shown in Figure 4) by causing counter-clockwise rotation of disc 131. Correspondingly, depression of shift key 71 causes shifting of the carriage to the left as viewed from the front of the machine by engagement of drive collar 98 with gear sleeve 104 to effect counter-clockwise rotation of disc 131 as viewed in Figure 4.

Means are provided for locking the carriage in any shifted position thereof, said means being releasable upon operation of either shift key. Referring to Figure 4, the shift disc 131 carries four pins equally spaced apart for cooperation with the upper end of a pair of scissor levers 167 and 168 suitably pivoted on plate 106. Stop arms 167 and 168 have a suitable connection for simultaneous pivoting movement in opposite directions, and are connected by spring 172. Stop arm 167 carries a depending arm 173 which lies in front of an ear 174 (Figures 4 and 5) of a link 176 pivotally connected to similar bell cranks 177. Each bell crank 177 has an arm 179 lying in front of the aligned push part 92 or 93 so that upon operation of either push rods 87 or 89 by the respective shift keys, the linkage is operated to rock the stop arms 167 and 168 to disengaged position.

The shift drive disc 131 has centralizing means associated therewith which operate to insure accurate position of the carriage in any shifted position thereof and which are controlled to be disabled during plural cycle operation of the shifting mechanism until the carriage is in the desired shifted position. As seen in Figure 4, the shift disc 131 is provided with four equally spaced centralizing depressions 181. Opposite depressions 181 are engaged by respective rollers 182 at the upper ends of respective centralizing bell cranks 183 and 184 pivoted on the plate 106. Spring 188 connects the bell cranks 183 and 184.

The lower arms of bell cranks 183 and 184 are suitably connected together so that the centralizing bell cranks move together. With the bellcranks 183 and 184 is a latch lever 194 which is urged clockwise by spring 197 to move into position to hold the bell cranks out of engagement with the shift disc 131. To maintain the latch 194 active during plural cycle operations, the lever 194 has an arm 201 which overlies a roller 203 carried by cam follower arm 204 pivoted on plate 153 and urged in a clockwise direction by spring 207. Cam follower arm 204 is provided with a tooth 208 which is adapted in the full cycle position of the parts to seat in a notch 209 of a cam disc 211 secured on the extended end 212 of one of actuating shafts 47. Latch lever 194 is normally held in inactive position by the follower arm 204 when it is seated in its notch. During continuous rotation of the cam disc 211 in the plural cycle operation, the cam follower arm 204 does not have sufficient time to enter the notch 209 so that the centralizing bell cranks 183 and 184 maintain the displaced position. The above mechanism is fully described and claimed in our copending application, Serial No, 343,386.

Means are provided for disabling the control of the keys when the carriage shifts into either of its end positions, and for this purpose means is provided for lifting the respective yieldable pusher links 83 and 83a when the carriage reaches its end position. As seen in Figure 3, lever 141 pivoted at 142 has an ear 143 underlying pusher link 83a and is pivotally and slidably connected at 144 with lever 146 pivoted on shaft 36. Lever 146 carries a roller 147 which overlies (Figure 4) an end of a lever 148 pivoted at 149 to the lower end of a lever 151 pivoted at 152 on a plate 153 carried by bracket 16. Lever 148 has a cam surface 154 normally abutting a pin 156 on plate 153. The upper arm of lever 151 carries a roller 157 which is adapted for engagement by arm 158 mounted on rack 134 when the carriage is shifted in its right end position (its leftmost position as viewed in Figure 4) to rock lever 151 in a counter-clockwise direction and thereby move lever 148 to the right as viewed in Figure 4, whereby pin 156 operates on cam surface 154 to rock lever 148 in a clockwise direction and operate the lever 146. The lever 146 is moved in a counter-clockwise direction as viewed in Figure 3 to oscillate lever 141 in a clockwise direction and therefore lift pusher link 83a against the tension of its spring 84a and move it out of engagement with push rod 89 which is therefore retracted on the influence of this spring 94 to disengage the drive connection between collar 98 and gear sleeve 104.

As seen in Figure 2, push link 83 has associated therewith a lever 159 which may be operated in any convenient manner from pawl 136 upon the first revolution of shift disc 131 when the carriage is in its end position to disengage the drive connection 101, 102 between collar 97 and gear sleeve 103. Thus, the drive connection from key 71 is broken the first revolution after the carriage is entering its end position, while the drive connection from shift key 70 is broken as the carriage enters its last position, so that there is no over-driving of the shift disc 131.

We claim:

1. In a calculating machine having a shiftable carriage, means for shifting said carriage, and drive means for said shifting means including a motor and a cyclic clutch for converting the non-cyclic motor drive to a cycle drive; said shifting means including a drive element and a drive establishing connection between said clutch and said drive element, a control key for said shifting means, controlling linkages from said key to said clutch and said drive establishing connection, said linkage to said drive establishing connection including a yieldable element, and means controlled by said carriage upon shifting into an end position for moving said yieldable element to disable said drive establishing connection and terminate the drive of said shifting means with said shift key depressed and with said clutch engaged.

2. In a calculating machine having a shiftable carriage, means for shifting said carriage, and drive means for said shifting means including a motor and a cyclic clutch for converting the non-cyclic motor drive to a cycle drive; said shifting means including a drive element and a drive establishing connection between said clutch and said drive element, a control key for said shifting means, controlling linkages from said key to said clutch and said drive establishing connection, said linkage to said drive establishing connection including a control member for said connection, a pusher arm for operating said member, spring means yieldably holding said pusher arm in active position, a lever having a portion operatively related to said pusher arm for moving said pusher arm against the urgency of said spring means to an inactive position, an operating linkage for said lever having a part disposed adjacent the path of travel of said carriage, and means on said carriage for engaging said part to operate said linkage and said lever to move said pusher arm to inactive position and disable said drive establishing connection with said shift key depressed and with said clutch engaged.

CARL M. FRIDEN.
ANTHONY B. MACHADO.